(12) United States Patent
Rigolet

(10) Patent No.: US 7,844,917 B2
(45) Date of Patent: Nov. 30, 2010

(54) OPTIMAL DISPLAY OF MULTIPLE WINDOWS WITHIN A COMPUTER DISPLAY

(75) Inventor: Jean-Yves Rigolet, Paris (FR)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 11/669,314

(22) Filed: Jan. 31, 2007

(65) Prior Publication Data

US 2007/0250788 A1 Oct. 25, 2007

(30) Foreign Application Priority Data

Apr. 20, 2006 (EP) .................................. 06300380

(51) Int. Cl.
*G06F 3/048* (2006.01)
(52) U.S. Cl. ...................... 715/798; 715/788
(58) Field of Classification Search ................ 715/798, 715/781, 788, 799, 800
See application file for complete search history.

(56) References Cited

U.S. PATENT DOCUMENTS

| 5,487,143 | A | * | 1/1996 | Southgate | 715/790 |
|---|---|---|---|---|---|
| 5,544,300 | A | * | 8/1996 | Skarbo et al. | 715/759 |
| 5,757,371 | A | * | 5/1998 | Oran et al. | 715/779 |
| 5,796,402 | A | | 8/1998 | Ellison-Taylor et al. | |
| 6,473,102 | B1 | * | 10/2002 | Rodden et al. | 715/788 |
| 6,484,261 | B1 | * | 11/2002 | Wiegel | 726/11 |
| 7,562,311 | B2 | * | 7/2009 | Schiller | 715/838 |
| 2002/0089546 | A1 | * | 7/2002 | Kanevsky et al. | 345/800 |
| 2004/0177319 | A1 | * | 9/2004 | Horn | 715/501.1 |
| 2006/0158385 | A1 | * | 7/2006 | Etelapera | 345/31 |

OTHER PUBLICATIONS

Cohen E S et al: "Automatic Strategies in the Siemens RTL Tiled Window Manager" Computer Workstations, 1988., Proceedings of the 2nd IEEE Conference on Santa Clara, CA, USA Mar. 7-10, 1998, Washington, DC, USA, IEEE Comput. SOC. PR, US, Mar. 7, 1998, pp. 111-119.

* cited by examiner

*Primary Examiner*—Tadesse Hailu
*Assistant Examiner*—Omar Abdul-Ali
(74) *Attorney, Agent, or Firm*—Yee & Associates, P.C.; David A. Mims, Jr.

(57) ABSTRACT

An apparatus and method for optimally displaying multiple windows on a display is provided. The multiple windows can be sequentially or simultaneously resized and/or repositioned. The method performs at least one of resizing or repositioning operation on at least one of the multiple windows to fit within the available display area. The method provides the user the ability to see a maximum of information from multiple windows and allows access to the scroll bars, title bars, status bars and command window of the multiple windows.

9 Claims, 9 Drawing Sheets

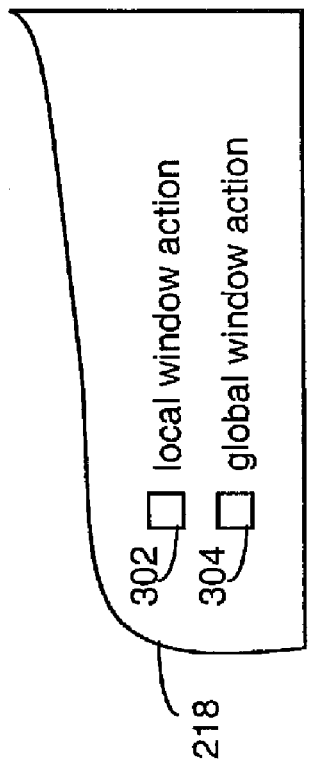
FIG. 3A
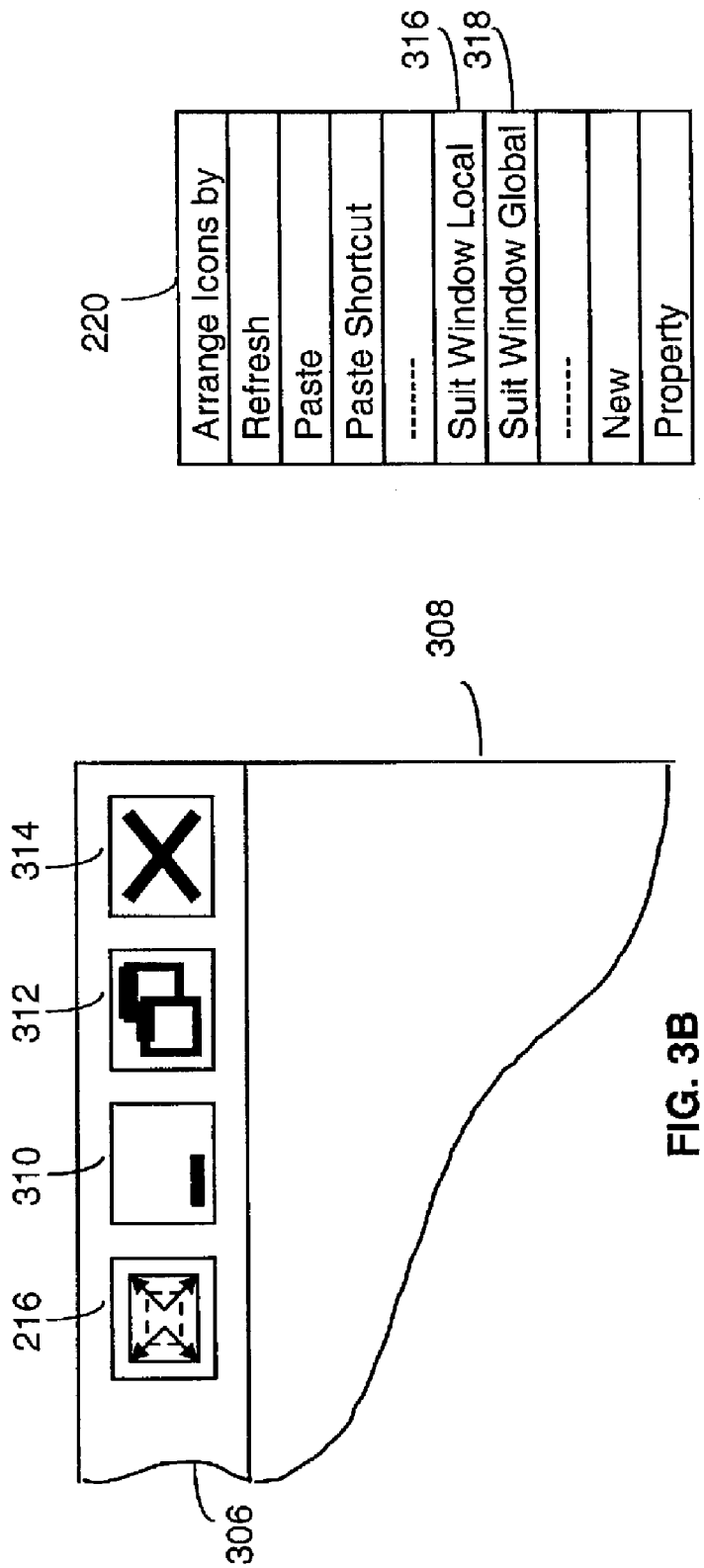
FIG. 3C
FIG. 3B

701

702

OPTIMAL DISPLAY OF MULTIPLE WINDOWS WITHIN A COMPUTER DISPLAY

TECHNICAL FIELD

The present invention relates to browser applications for use in multiple windows environment and, more particularly, to a method, apparatus and computer product to optimize the arrangement of the multiple windows on a computer display.

BACKGROUND

Modern software requires substantial amounts of information to be displayed upon a computer display. Generally, users of complex software programs maintain many open windows upon a computer display such that information is continuously and readily available. These windows may display information and/or contain graphical user interfaces (GUIs) used to control execution of a program. Furthermore, users typically execute multiple programs simultaneously such that one or more windows are displayed for each executing program. The result is a computer display that is cluttered with windows and a requirement for the user to continuously manipulate the windows to control the content being displayed.

More specifically, when multiple windows are positioned on the screen, opening a new window and displaying its contents may lead to some fastidious and numerous manual operations (i.e., mouse and button manipulation) to manipulate the windows into an understandable view. Solutions to manually manage multiple windows in a Graphical User Interface (GUI)-based operating system are known in the art. In the known solutions based on the actual graphics possibilities provided by various operating systems, for example, "Windows", Mac OS, and GNOME, the method to manually optimize the arrangement of a number of windows on the screen includes resizing the form factor of a window and window placement. Resizing the form factor may be performed using basic control buttons of the window. These control buttons are typically located in a title bar and are used to manage window operations such as maximize, minimize and close. Additionally, a resizing edge capability is available to allow a user to modify the form factor of the window by selecting the edge that needs to be shifted and "dragging" the edge to resize the window. Also, global window placement can be arranged on the screen by moving a chosen window from one location to another. Such window movement requires a user to "drag and drop" the window using manipulations of the mouse or other input device.

The other solutions known in the art may involve closing of open windows, stopping of running applications or shrinking of undesirable windows and sending them to a taskbar. However, the necessity to open multiple windows to control or monitor data processing operations such as interactive programs, implies that the program results and action menus have to be permanently displayed on the front view of the screen. Thus, these solutions may not be viable in most cases.

Many business scenarios, such as stock trading, involve technical tasks that require a user to open multiple windows. These multiple windows allow the user to access the necessary information required for a running activity—the stock prices in this particular case. The usual problem is that some of the windows may stack on one another while other windows may overlap. Often, a main window may be hidden, or the content is not fully displayed causing dissatisfaction to the user. In order to create a better placement and viewing, certain manual operations, including but not limiting to, move, magnify, resize, drag, close, shrink, expand, shift, and abut may continuously need to be performed by the user.

Thus, it may be seen that the existing solutions to manage multiple windows on the screen present several drawbacks. Some of them include:

1. The active area of the screen is not fully populated.
2. The multiple window openings are not dynamically arranged on the screen.
3. The content of the multiple windows is not completely displayed.
4. The resizing of the window opening to fit both contents and free area pixels of the screen is not optimized.
5. The mixing up operation of multiple windows is fastidious and not monitored.
6. The GUI basic actions do not allow the user to utilize the screen completely.
7. The optimal arrangement of multiple windows may be difficult to obtain manually, such as by using computer mouse or light pen.
8. Depending on the window location on the screen, and in particular, when a window is near to the screen border, it is not possible to access to window commands and scroll bars with the classic API (Application Programming Interface) such as the maximize action or resize action.
9. Many browsers do not allow resizing of a window, if the window is maximized.

As mentioned above, prior art solutions are not fully appropriated with the new trend of program development and technology evolution.

Thus there is a need for a solution that arranges multiple windows within a given screen, and maximizes the area utilization of the screen by using an enhanced placement method that gives the user a perfect viewing of the multiple window content.

SUMMARY

The present invention is directed to a method, apparatus and computer product for optimizing the arrangement of multiple windows on a computer display.

Accordingly, the present invention provides a method for determining parameters of a display and multiple windows displayed on the display. The method further calculates new parameters for a selected window based on the content of the selected window and performs at least one of resizing and repositioning operation on the selected window based on the new parameters by altering outline edges of the selected window and moving the selected window to a corresponding immediate corner of the display and an abutment of outline edges of the adjacent windows. The resultant window is located around the initial location after resizing or repositioning the selected window.

BRIEF DESCRIPTION OF THE DRAWINGS

The above and other items, features and advantages of the invention will be better understood by reading the following more particular description of the invention in conjunction with the accompanying drawings wherein:

FIGS. 3A, 3B and 3C show a global overview of the elements that need to be implemented to configure and run the present invention;

DETAILED DESCRIPTION

In the foregoing description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of the present invention.

The present invention can take the form of an entirely hardware embodiment, an entirely software embodiment or an embodiment containing both hardware and software elements. In accordance with an embodiment of the present invention, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid disk and an optical disk. Current examples of optical disks include compact disk—read only memory (CDROM), compact disk read/write (CD-R/W) and DVD.

Figure 1:
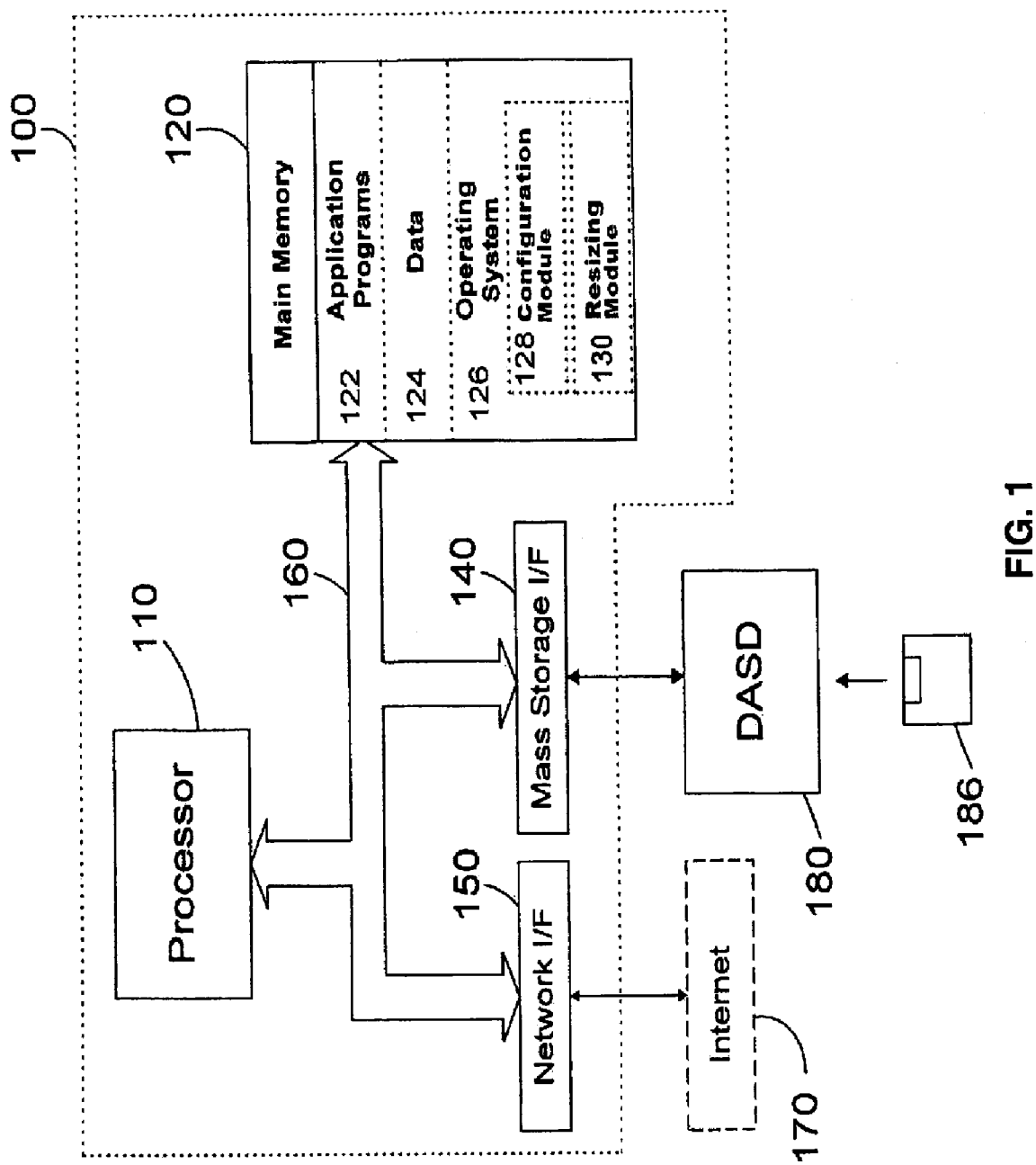
FIG. 1 illustrates a computer system in accordance with an embodiment of the present invention.

FIG. 1 depicts a block diagram of a computer system 100 in accordance with an embodiment of the present invention includes a processor 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of possible additions include: a display, a keyboard, a cache memory, and peripheral devices such as printers.

Processor 110 can be constructed from one or more microprocessors and/or integrated circuits. Processor 110 executes program instructions stored in main memory 120. Main memory 120 stores programs and data that computer system 100 may access. Main memory 120 includes one or more application programs 122, data 124, operating system 126, a configuration module 128 and a resizing module 130. When computer system 100 starts, processor 110 initially executes the program instructions that make up operating system 126. Operating system 126 is a sophisticated program that manages the resources of computer system 100 for example, processor 110, main memory 120, mass storage interface 140, network interface 150, and system bus 160.

Application programs 122 are executed by processor 110 under the control of operating system 126. Application programs 122 can be run with program data 124 as input. Application programs 122 can also output their results as program data 124 in main memory. In one embodiment of the present invention, computer system 100 includes configuration module 128 that allows management of the arrangement of multiple windows which are to be automatically resized and repositioned on the display. Computer system 100 further includes resizing module 130 for resizing and/or repositioning multiple windows on the display. The "modules" are software code that may be a callable routine or embedded into another program, i.e., an operating system or application program. For example, although configuration module 128 and resizing module 130 are shown as a part of operating system 126 in accordance with one embodiment of the invention, it is equally within the scope of the present invention to provide a separate software application or utility that could also provide configuration module 128 and resizing module 130 separate from operating system 126.

Mass storage interface 140 allows computer system 100 to retrieve and store data from auxiliary storage devices such as magnetic disks (hard disks, diskettes) and optical disks (CD-ROM). These mass storage devices 180 are commonly known as Direct Access Storage Devices (DASD), and act as a permanent store of information. One suitable type of DASD 180 is a floppy disk drive 180 that reads data from and writes data to a floppy diskette 186. The information from the DASD can be in many forms. Common forms are application programs and program data. Data retrieved through mass storage interface 140 is usually placed in main memory 120 where processor 110 can process it.

While main memory 120 and DASD 180 are typically separate storage devices, computer system 100 uses well known virtual addressing mechanisms that allow the programs of computer system 100 to run smoothly as if having access to a large, single storage entity, instead of access to multiple, smaller storage entities (e.g., main memory 120 and DASD device 180). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. In addition, an apparatus in accordance with the present invention includes any possible configuration of hardware and software that contains the elements of the invention, whether the apparatus is a single computer system or is comprised of multiple computer systems operating in concert.

Network interface 150 allows computer system 100 to send and receive data to and from any network connected to computer system 100. This network may be a local area network (LAN), a wide area network (WAN), or more specifically the Internet 170. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 110, or may include I/O adapters to perform similar functions.

The remainder of this specification describes in exemplary embodiments how the present invention improves the convenience of viewing multiple windows simultaneously on the display by performing at least one of resizing and repositioning operation on one or more windows using available display size. Those skilled in the art will appreciate that the present invention applies equally to any type of computer window generated on any type of computer display using any type of computer program, including applications and system programs.

Figure 2:
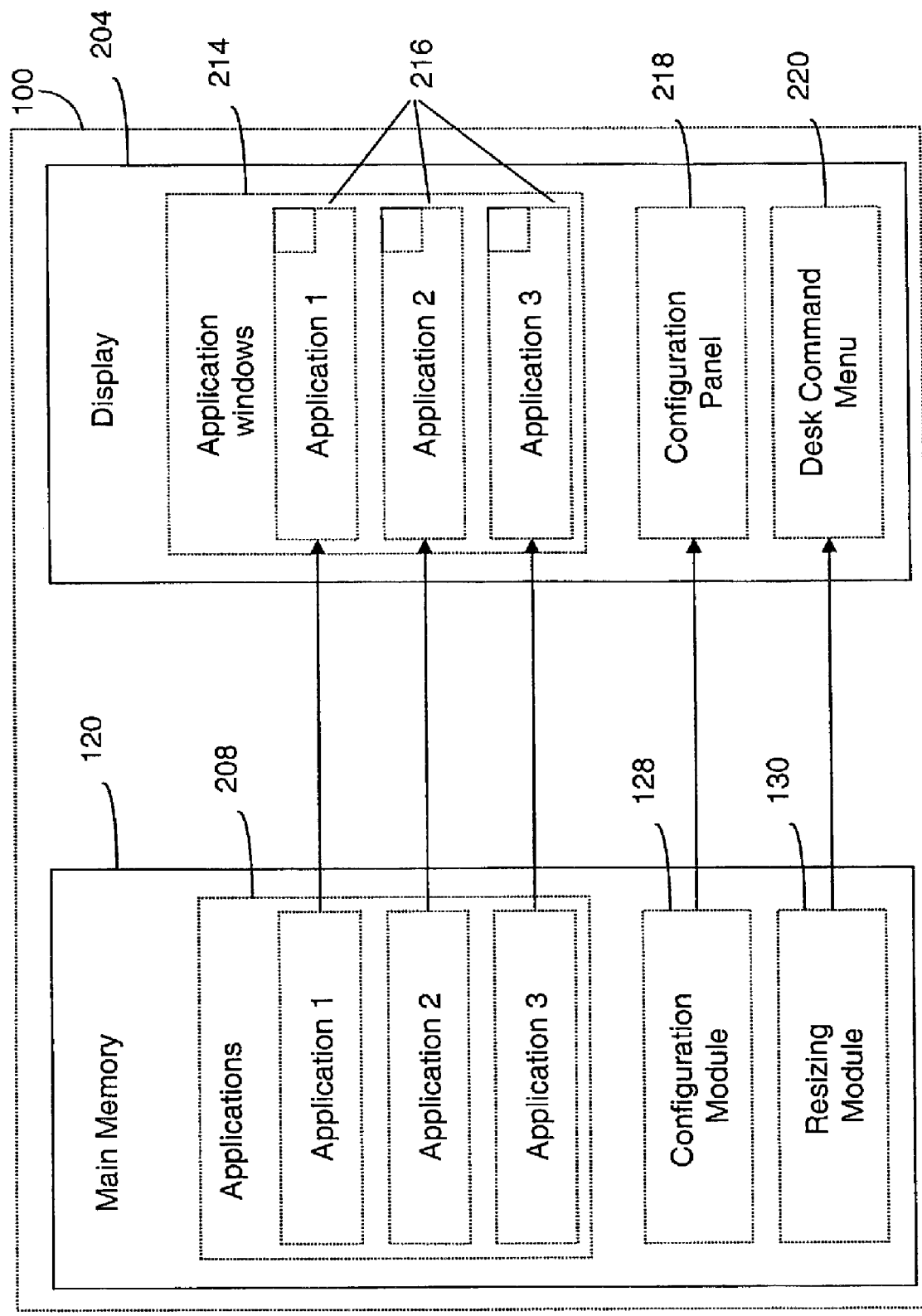
FIG. 2 illustrates a computer system optimally displaying multiple windows in accordance with an embodiment of the present invention.

Referring to FIG. 2, computer system 100 is shown to further include a display 204. For the sake of clarity, FIG. 2 shows main memory 120 directly coupled to display 204, recognizing that there may be intervening circuitry or operations between the information in main memory 120 and display 204. Main memory 120 includes applications 208, a configuration module 128 and a resizing module 130. Any number of applications may be running and stored in main memory 120. Configuration module 128 allows a user to initiate a process that manages arrangement of multiple windows on display 204. These multiple windows may relate to single or multiple different applications. Resizing module 130 performs at least one of resizing and repositioning operation on one or more windows and gives the user the ability to see maximum information from multiple windows simultaneously. Further, resizing module 130 allows the user to manage the arrangement of multiple windows so as to manipulate scroll-bars of the open windows (that could be hidden otherwise).

Display 204 includes multiple application windows 214 with each window containing an icon 216 in a title bar. Display 204 further includes a configuration panel 218 and a desk command menu 220. Desk command menu 220 and icon 216 constitute a graphical user interface for resizing a window.

Application windows 214 on display 204 are created by corresponding applications 208 (e.g., application 1, application 2 . . . application n) running in main memory 120. Application windows 214 contain the standard buttons, namely, maximize, minimize and close buttons in respective title bars. Application windows 214 further display icon 216 in the title bar once configuration module 128 has been activated. Desk command menu 220 is displayed on display 204 when a user "right clicks" a mouse. Resizing module 216 is executed when a user clicks icon 216 or appropriate buttons in desk command menu 220 or both. It will be apparent to a person skilled in the art that different variations of the present invention are possible. In accordance with one embodiment, only an icon on the title bar for resizing and repositioning a window is included. In accordance with another embodiment, a desk command menu comprising buttons for resizing and repositioning windows is included.

FIG. 3A illustrates configuration panel 218 comprising a plurality of buttons in accordance with an embodiment of the present invention. The buttons include a local window action button 302 and a global window action button 304. Once local window action button 302 or global window action button 304 in configuration panel 218 is enabled, configuration module 128 is activated and enables management of multiple windows.

The selection of local window action button 302 allows resizing and repositioning of a window in the display so that multiple windows may be optimally arranged on the display in a sequential manner. The selection of global window action button 304, on the other hand, sequentially or simultaneously manages the placement of multiple windows to be resized and repositioned in real time.

FIG. 3B depicts an icon 216 in a title bar 306 of a selected window 308. Title bar 306 of selected window 308 further comprises standard icons, for example, a minimize icon 310, a maximize icon 312 and a close icon 314.

FIG. 3C depicts a desk command menu 220 in accordance with an embodiment of the present invention. Desk command menu 220 includes a first button 316 and a second button 318 for optimizing the arrangement of multiple windows locally and globally, respectively. First button 316 is referred to as a suit window local button, while the second button 318 is referred to as a suit window global button. Configuration panel 218 along with first and second buttons 316 and 318 and corresponding icon 216 correctly installs and configures the disclosed invention in operating system 126.

An embodiment of the invention presents three modes of functionality depending on the selection of different buttons within configuration panel 218.

In accordance with first mode, neither local window action button 302 nor global window action button 304 is selected. Accordingly, computer system 100 operates as usual as no dynamic action is triggered. Multiple windows may be resized and repositioned using any of the presently available solutions.

In accordance with second mode, local window action button 302 is enabled in configuration panel 218. The enabling of local window action button 302 in configuration panel 218 allows configuration module 128 to initiate a process that manages optimization of the windows sequentially. Icon 216 is displayed in title bar of each window once local window action button 302 is selected in configuration panel 218. Further, desk command menu 220 displays Suit Window Local button 316 and Suit Window Global button 318. Desk command menu 220 can be accessed by the user by clicking on the right button of the mouse.

A Suit Window Local application, that corresponds to sequential optimization of multiple windows, is invoked by clicking either icon 216 in title bar 306 of selected window 308 or by using Suit Window Local button 316 available in desk command menu 220. This application optimizes the arrangement of windows sequentially. When activated, the suit window local application automatically performs at least one of resizing and repositioning operation on the selected window to satisfy the user expectation. The window resizing and repositioning is performed using maximum available display size with a minimum amount of window movement. Therefore, the resultant window is almost located at the same zone as previously located.

In accordance with third mode, global window action button 304 is selected in configuration panel 218 to enable configuration module 128 to initiate an application that manages optimization of the multiple windows that need to be resized and/or repositioned. The optimization of the multiple windows may be performed sequentially or simultaneously after selecting global window action button 304. The configuration of the third mode is indicated to the user by the presence of icon 216 in title bar of each window in addition to the presence of Suit Window Local button 316 and Suit Window Global button 318 in desk command menu 220.

The Suit Window Global application, that corresponds to simultaneous optimization of multiple windows, is invoked by user first by clicking on icon 216 in title bar 306 of selected window 308 and then selecting Suit Window Global button 318 available in desk command menu 220. This leads multiple windows to be simultaneously resized and/or repositioned together to fit with the available display size.

The Suit Window Local application, that corresponds to sequential optimization of multiple windows, is invoked by user by either clicking on icon 216 in title bar 306 of selected window 308 or by selecting Suit Window Local button 316 available in desk command menu 220. This leads multiple windows to be sequentially resized and/or repositioned together to fit with the available display size.

Figure 4:
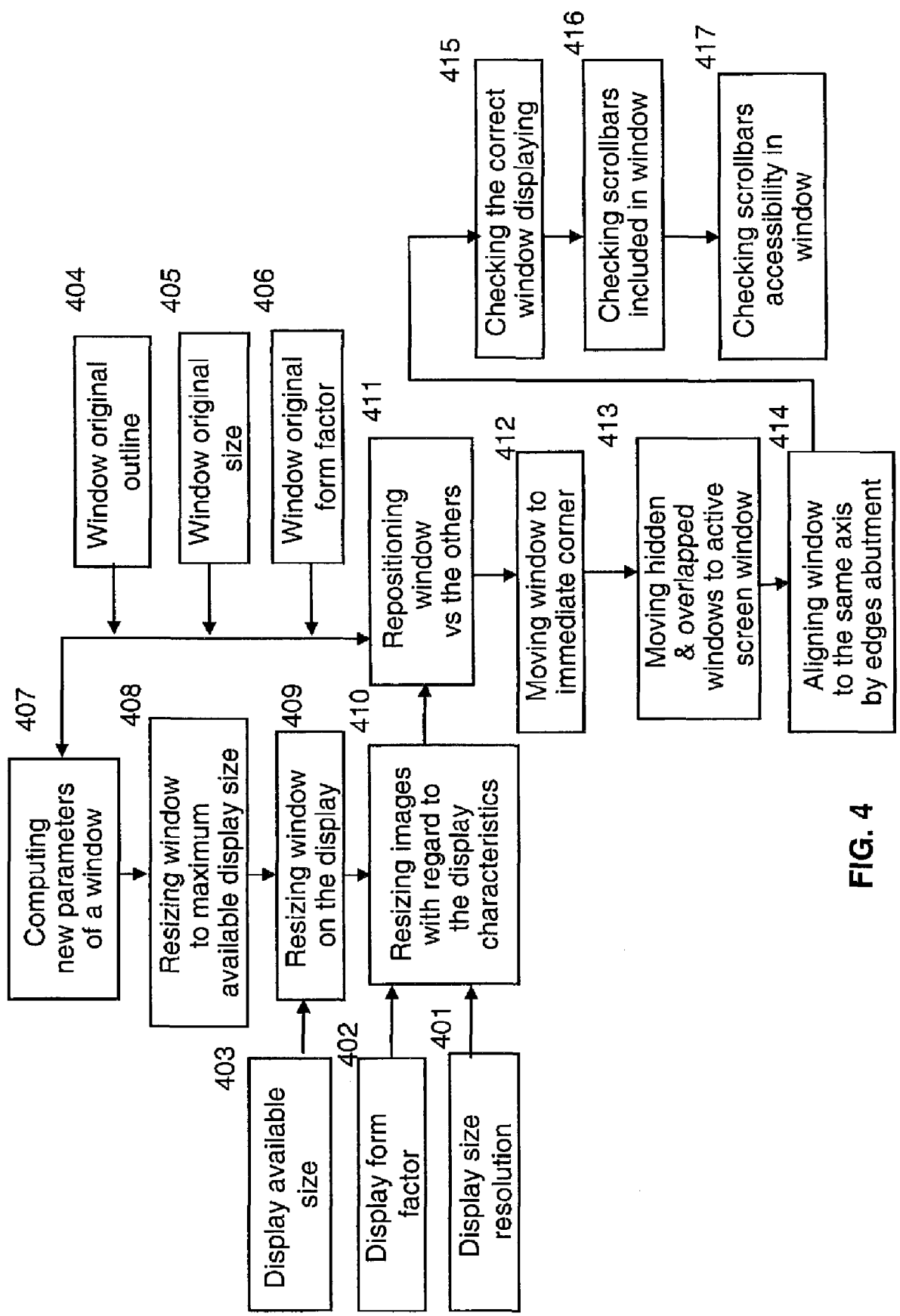
FIG. 4 represents the flow chart of the "Disclosed Window Resizing Computation Algorithm" (DWRCA).

FIG. 4 shows a flowchart depicting "Disclosed Window Resizing Computation Algorithm" (DWRCA) in accordance with an embodiment of the present invention. The algorithm performs a series of operations for each of the multiple windows that are to be optimized. A window optimization may result in resizing the window or repositioning the window or performing both resizing and repositioning. The multiple windows can be sequentially or simultaneously resized and/or repositioned.

At step 401, display resolution is measured. Further, a form factor of the display is measured at step 402 followed by the measurement of available size of the display at step 403. The available size of the display is the entire display area available for multiple windows to be displayed on the display. Once the parameters (including display resolution, form factor and available size) of the display are determined, the parameters of the multiple windows are determined. The parameters of the multiple windows are determined so that the size and position of the multiple windows on the display is considered before performing a window optimization.

At step 404, the original outline of the multiple windows is determined. The original outline ascertains the position (x-coordinate, y-coordinate) of a window on the display. At step 405, the original size (width and height) of each window is determined. Further, the original form factor of each window is determined at step 406.

After determining the parameters (including original outline, original size and original form factor) of the multiple windows a new size of a window to be optimized is computed at step 407. In case of sequential arrangement of the multiple windows, the first window to be optimized may be selected by the user. In case of simultaneous arrangement, the sequence of selection of windows may be randomly defined (clockwise or anticlockwise) by the user. The new size of the selected window is a function of its content which includes text, image, program panel, rolling menus and the like. The width of the selected window is computed based on the content to ensure that maximum content of the window is being displayed while ensuring minimum movement of the selected window on the display.

The selected window is resized to a maximum available size of the display, if necessary, at step 408. Next, the selected window is resized on the display based on the new size at step 409. Further, the contents including the size of the scroll bars and the title bars of the selected window are resized, if the selected window is resized in various directions. The images on the selected window are resized with regard to the display parameters (including display resolution and form factor) to prevent them from becoming larger than the screen resolution at step 410.

The selected window is repositioned with respect to other windows at step 411. The present invention provides different possibilities to reposition the multiple windows on the display. The selected window is moved to an immediate corner of the display at step 412. The selected window can be repositioned either to an immediate corner of the display or can be located in the middle of the display. For example, if five windows are to be repositioned in the display, the resultant arrangement of the windows can lead to four windows at each corner of the display while one window in the middle of the display.

At step 413, the hidden and overlapped windows are moved to an active window of the display. The active window of the display is the available area of the display to position the multiple windows. This moving is done because some of the multiple windows may overlap with the other windows or some of the multiple windows may be partially hidden by other windows. The active area of the display does not count the display area reserved for user initiative order or computer program panels.

Next, the selected window is aligned to the same axis by edges abutment at step 414. The axis of the windows adjacent to the selected is considered before repositioning a selected window. Step 414 ensures that the edges of the selected window on an X axis abut the edges of other windows on X axis. Similar operation is performed on a Y axis. For example, if five windows are to be repositioned on the display, the final optimization may result in four windows at each corner and one window in the middle of the display. The window in the middle of the display may be aligned with two Y edges abutment with the Y screen and two X axis abutments with the four other windows.

The shape of the selected window can be resized, expanded, shrunk, moved, or abutted with respect to a distant edge that serves as a reference.

Further, it is checked if the selected window is fully displayed at step 415. To determine if the selected window is fully displayed, it is checked whether the scrollbars or equivalents are included in the selected window at step 416. Further, it is determined if the scrollbars or equivalents are accessible to the user at step 417.

The window resizing and/or repositioning is performed using maximum available size of the display with a minimum location change of a selected window. The repositioned window is located on the display with minimum movement on the display. However, the repositioned windows may be of a different size.

Figure 5:
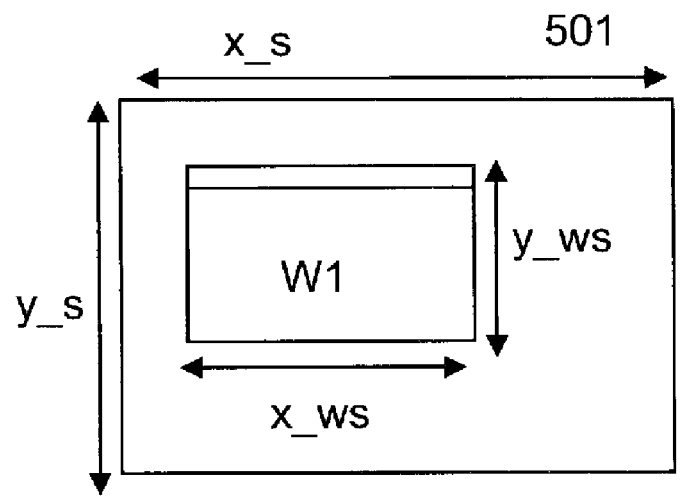
FIG. 5 illustrates the resizing and repositioning action performed by DWRCA to a single window on the display in accordance with an embodiment of the present invention.
Figure 5:
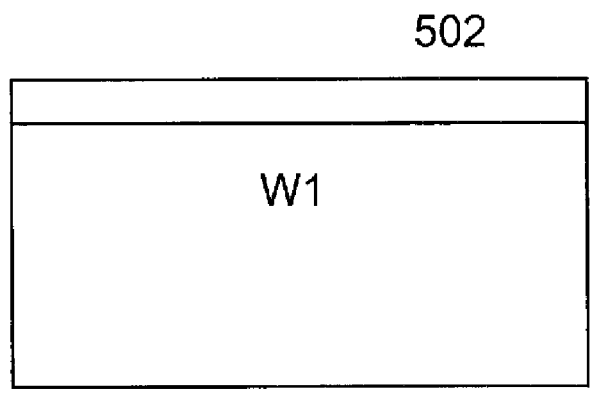

FIG. 5 illustrates the resizing and repositioning action performed by DWRCA on a single window in accordance with an embodiment of the present invention. Display 501 contains a window W1 displayed at an arbitrary position. Window W1 may be opened using any application, for example, word processor, spreadsheet program or acrobat application. When DWRCA is run, it computes the display parameters as well as the window parameters prior to resizing and repositioning operation. In accordance with an exemplary embodiment, the display size may be determined as $$x\_s * y\_s$$

where $x\_s$ is the width of the display
$y\_s$ is the length of the display

The window size may be determined as $$x\_ws * y\_ws$$

where x_ws is the width of the window
y_ws is the length of the window

DWRCA computes new parameters for resizing and repositioning of window W1. Since a single window is to be resized and repositioned, DWRCA would resize the window W1 to occupy the entire available display size. The new size of window W1 would change to x_s*y_s and the position of window W1 would be (0, 0). Thus, after the resizing and repositioning operation, window W1 would be displayed as depicted in block 502.

Figure 6:
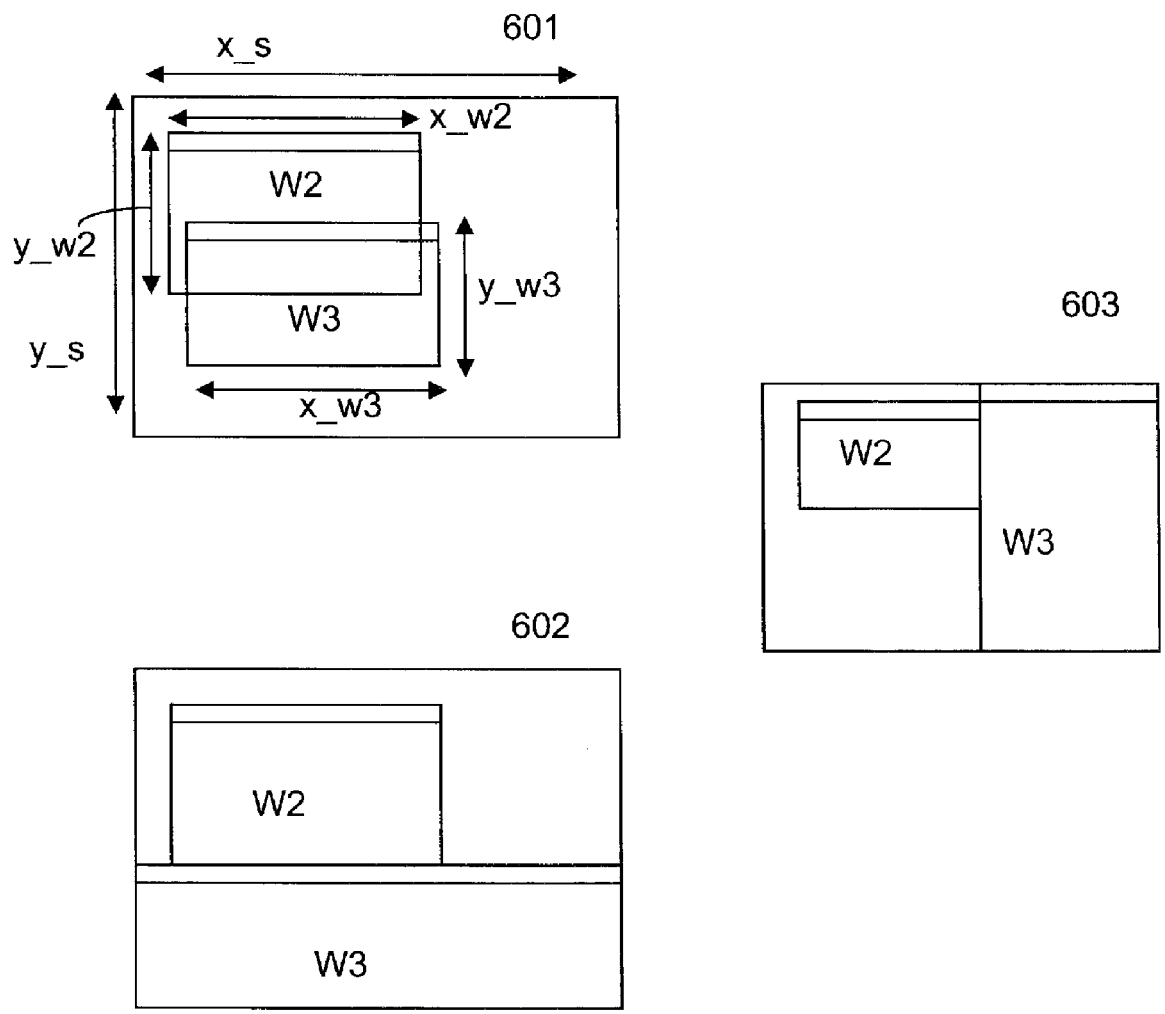
FIG. 6 illustrates the resizing and repositioning action performed by DWRCA to two windows on the display in accordance with an embodiment of the present invention.

FIG. 6 illustrates the resizing and repositioning action performed by DWRCA on two overlapping windows in accordance with an embodiment of the present invention. Display 601 contains overlapping windows W2 and W3 displayed at an arbitrary position.

To resize and reposition windows W2 and W3, DWRCA computes the parameters of windows W2 and W3. In accordance with an exemplary embodiment, the display size may be determined as $$x\_s * y\_s$$

while the parameters of windows W2 and W3 are determined as follows:

W2—window size is x_w2*y_w2 and position is (xp_w2, yp_w2)

W3—window size is x_w3*y_w3 and position is ((xp_w3, yp_w3)

where
x_w2 is the width of the window W2
y_w2 is the length of the window W2
xp_w2 is the x-coordinate of the window W2
yp_w2 is the y-coordinate of the window W2
x_w3 is the width of the window W3
y_w3 is the length of the window W3
xp_w3 is the x-coordinate of the window W3
yp_w3 is the y-coordinate of the window W3

In case of overlapping windows, the selected window is repositioned according to the maximum width overlaid. The DWRCA computes the new size and position of window W3 based on the overlapping length o_len and overlapping width o_wid of window W3 on window W2. If overlapping width o_wid of window W3 is greater than the overlapping length o_len of window W2, the size and position of window W3 after computation is as follows:

W3—window size is x_w3*y_w3 and position is (xp_w3, yp_w3)
wherein $$x\_w3 = x\_s$$

$$y\_w3 = y\_s - (y\_w2 + yp\_w2)$$

$$yp\_w3 = yp\_w2 + y\_w2$$

$$xp\_w3 = 0$$

Using the aforesaid parameters, DWRCA resizes window W3 to fit the available display size with borders joined to an immediate border of window W2 and the corresponding display edges as depicted in display 602.

If overlapping length o_len of window W3 is greater than the overlapping width o_wid of window W2, the window size and position of window W3 after computation is as follows:

W3—window size is x_bw*y_bw and position is (xp_bw, yp_bw)
wherein $$x\_w3 = x\_s - (x\_w2 + xp\_w2)$$

$$y\_w3 = y\_s$$

$$xp\_w3 = xp\_w2 + x\_w2$$

$$yp\_w3 = 0$$

Using the aforesaid parameters, DWRCA resizes window W3 to fit the available display size with borders joined to an immediate border of window W2 and the corresponding display edges as depicted in display 603. Displays 602 and 603 illustrate window W3 being stretched, however window W3 can be resized and repositioned as per user's preference.

Figure 7:
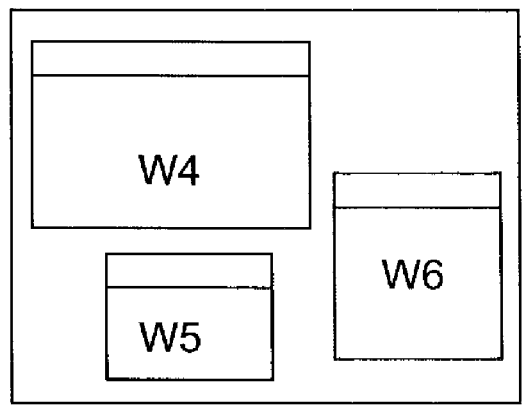
FIG. 7 illustrates three windows being displayed optimally using DWRCA in accordance with an embodiment of the present invention.
Figure 7:
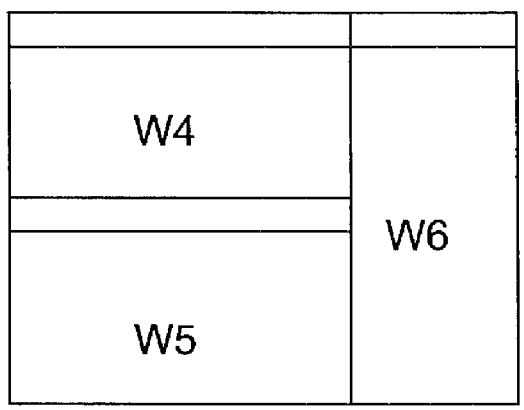

FIG. 7 illustrates three windows being displayed optimally using DWRCA in accordance with another embodiment of the present invention. Display 701 shows three different windows namely, W4, W5 and W6 placed such that windows W4, W5 and W6 are at some distance from one another. The windows W4, W5 and W6 may relate to a single application or to multiple different applications.

DWRCA computes the parameters of display and windows W4, W5 and W6 to ascertain the size and position of the display and the windows W4, W5 and W6. The parameters of each window include original outline, original size and original form factor of each window. It then determines the new parameters of each window based on the available display size. DWRCA then resizes and repositions the windows based on the new parameters as shown in display 702. The resizing of the windows may result in windows with different sizes as each window is resized depending upon the available display size. However, the window is repositioned at approximately the same location.

Figure 8:
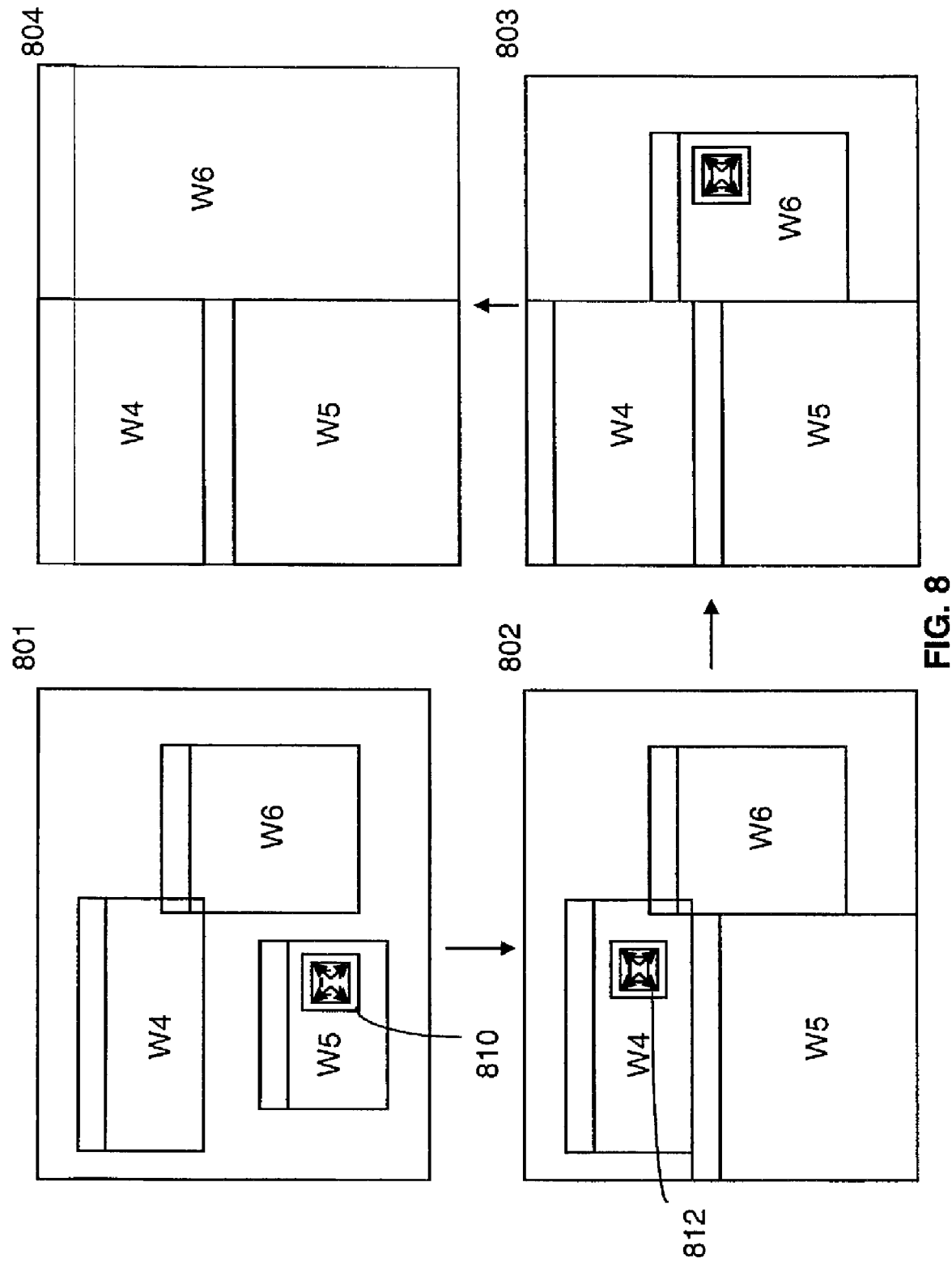
FIG. 8 represents a "Suit Window Local" process based on "local window action" configuration of the present invention.

FIG. 8 illustrates the arrangement of windows in accordance with the second mode of functionality of the present invention. The second mode is activated when local window action button 302 is enabled on configuration panel 218. In accordance with another embodiment of the present invention, local window action functionality may be auto configured.

Display 801 shows three different windows namely, W4, W5 and W6 such that windows W4 and W6 overlap and are placed at a distance from window W5. The windows W4, W5 and W6 may relate to a single application or to multiple different applications. The user initiates the Suit Window Local action that optimizes a window arrangement on the display containing three different windows. The Suit Window Local action gives the user the flexibility to sequentially optimize the windows.

Window W5 is selected by the user to be resized and repositioned by clicking a corresponding icon 810 in a title bar of window W5 or a Suit Window Local button 316 in desk command menu 220. On clicking icon 810 or Suit Window Local button 316, the DWRCA runs in order to resize and reposition window W5 by respectively expanding its outline edges from the initial position to the abutment of window W4 and window W6 and the immediate corner available on the display, the bottom left corner in this case. The arrangement of windows after window W5 is resized and repositioned is depicted in block 802.

The user may then select window W4 which is overlapped with window W6 by clicking a corresponding icon 812 in a title bar of window W4 or a Suit Window Local button 316 in desk command menu 220. The DWRCA runs in order to resize and reposition the window W4 by respectively expanding its outline edges from the initial position to the abutment of the immediate corner available on display 803, the top left corner in this case. Additionally, the DWRCA removes the overlap between windows W4 and W6 by aligning windows W5 and W4 in the same axis.

Next window W6 is arranged to fit with the available display size left on the display. Window W6 is selected by the user in the similar manner. Since window W6 is tangent to the windows W5 and W4, the DWRCA resizes and repositions window W6 by expanding its outline edges from the initial position to the abutment of the immediate corners available on the display namely, the top and bottom right corners as shown in block 804.

Figure 9:
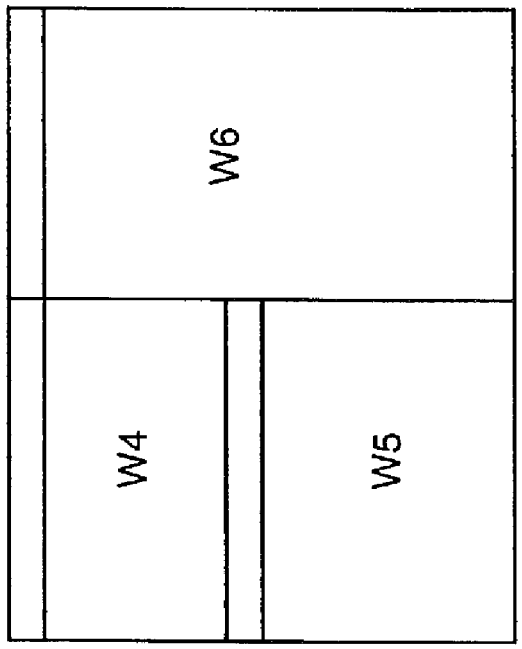
FIG. 9 represents a "Suit Window Global" process based on "global window action" configuration of the present invention.
Figure 9:
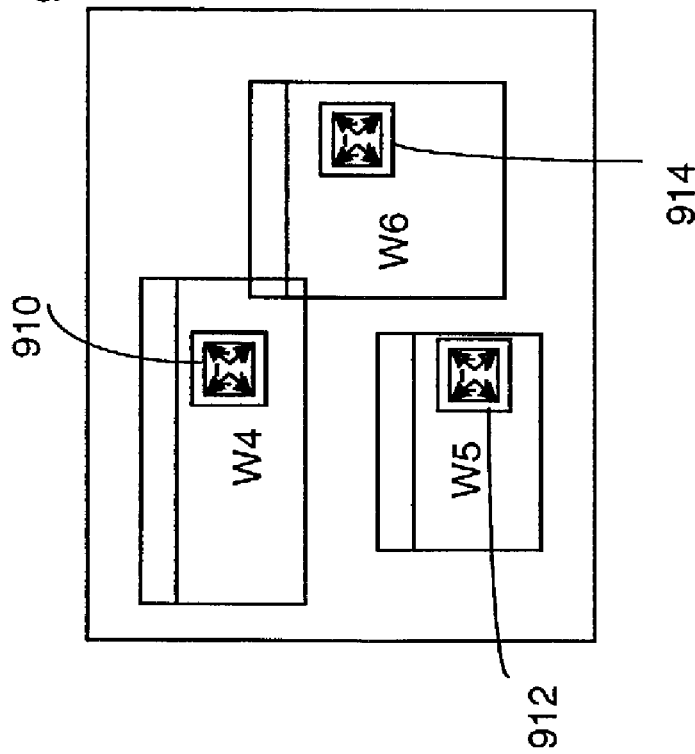

FIG. 9 illustrates the arrangement of windows in accordance with the third mode of the present invention. The third mode gets activated when global window action button 304 is enabled on configuration panel 218. In accordance with another embodiment of the present invention, the global window action functionality may be provided as an integral functionality in the operating system. The Suit Window Global action gives the user the flexibility to sequentially or simultaneously optimize the placement of multiple windows that need to be resized and repositioned in real time. Sequential optimization of the multiple windows is achieved as described in FIG. 8. Simultaneous optimization of the multiple windows is described using the foregoing description.

Display 901 shows an arrangement containing three different windows respectively named W4, W5 and W6 such that windows W4 and W6 overlap each other and are distant from window W5.

From the initial windows position given in display 901, the simultaneous optimization is initiated, first by clicking on any of icons 910 or 912 or 914 included in a title bar of the windows W4, W5 and W6 respectively and second, by selecting Suit Window Global button 318 in desk command menu 220.

When Suit Window Global button 318 is activated, the DWRCA determines the appropriate windows that need to be optimized from an initial to a final arrangement and defines the accurate transformation in terms of size, form factor, area and location with regard to the available display area and automatically restarts the window placement process on a user request. The appropriate arrangement is performed by modifying the initial window size and position by respectively expanding the outline edge of the selected window to the abutment of both the outline edges of the others windows and an immediate corner of the display to get the final optimization as depicted in block 902. In addition, the DWRCA considers the initial location of each window so that the resultant window is almost located at the same zone as previously located before running the "Suit Window Global" action. The DWRCA also resizes the inside of the window to fit the contents. That means the resultant size that is computed also includes the total size of scroll bars, status bars, toolbars and title bars.

The optimization of the multiple windows in the third mode can be in clockwise or anticlockwise direction. It is up to the user to select the window he wants to manipulate. It is also possible to optimize only one window out of the multiple windows.

Although various embodiments which incorporate the teachings of the present invention have been shown and described in detail herein, those skilled in the art can readily devise many other varied embodiments that still incorporate these teachings.

The invention claimed is:

1. A computer implemented method comprising:
   a. determining parameters of a display;
   b. determining parameters of multiple windows;
   c. calculating new parameters for a selected window based on the content of the selected window;
   d. initiating a process for managing the arrangement of the multiple windows either (1) sequentially one at a time as initiated by a user selection of (i) either an icon in a title bar of each one of the multiple windows or (ii) a user specified preference selected from a list comprising a local window action for selecting the sequential process, or (2) simultaneously as determined by the user specified preference selected from the list comprising a global window action for selecting the simultaneous process;
   e. performing at least one of resizing and repositioning operation on the selected window based on the new parameters by altering outline edges of the selected window and moving the selected window to a corresponding immediate corner of the display and an abutment of outline edges of the adjacent windows, wherein the resultant window is positioned near the initial location after at least resizing or repositioning the selected window; and
   f. responsive to the sequential process being selected, performing step e. for each one of a plurality of windows per the user selection, wherein each one of the plurality of windows is simultaneously displayed on the display after completion of the sequential process for each one of the plurality of windows.

2. The method as claimed in claim 1, further comprising moving a hidden and overlapped window to an active window of the display.

3. The method as claimed in claim 1, further comprising checking whether a scroll bar, a status bar, a toolbar and a title bar of the resultant window is visible in the display after being positioned.

4. The method as claimed in claim 1, wherein the at least one of resizing and repositioning operation is performed sequentially, and wherein the icon is displayed in a title bar of each one of the multiple windows responsive to a local window activation button being selected in a configuration panel.

5. The method as claimed in claim 1, wherein the resizing operation and the repositioning operation are both performed, and wherein the repositioning operation is performed after the resizing operation.

6. The method as claimed in claim 1, wherein the parameters of the display include form factor, display resolution and available size on the display.

7. The method as claimed in claim 1, wherein the parameters of the selected window include outline of the window, window size, window content and form factor.

8. A computer program product comprising a computer useable medium including a computer readable program stored thereon, wherein the computer readable program when executed on a computer causes the computer to:
   a. determine parameters of a display;
   b. determine parameters of multiple windows;
   c. calculate new parameters for a selected window based on the content of the selected window;
   d. initiating a process for managing the arrangement of the multiple windows either (1) sequentially one at a time as initiated by a user selection of (i) either an icon in a title bar of each one of the multiple windows or (ii) a user specified preference selected from a list comprising a local window action for selecting the sequential process, or (2) simultaneously as determined by the user specified preference selected from the list comprising a global window action for selecting the simultaneous process;
   e. perform at least one of resizing and repositioning operation on the selected window based on the new parameters by altering outline edges of the selected window and moving the selected window to a corresponding immediate corner of the display and an abutment of outline edges of the adjacent windows, wherein the resultant window is positioned near the initial location after resizing and repositioning of the selected window; and f. responsive to the sequential process being selected, performing step e. for each one of a plurality of windows per the user selection, wherein each one of the plurality of windows is simultaneously displayed on the display after completion of the sequential process for each one of the plurality of windows.

9. An apparatus comprising:

a. a memory;

b. a resizing module, residing in the memory, for performing at least one of resizing and repositioning operation on one or more windows in a display utilizing available display size, wherein the resizing module determines parameters of the display and the one or more windows; wherein the resizing module calculates new parameters for a selected window based on the content of the selected window; wherein the resizing module modifies the size and position of at least one window by altering outline edges of the selected window and moving the selected window to a corresponding immediate corner of the display and an abutment of outline edges of the adjacent windows;

c. a graphical user interface, wherein the graphical user interface comprises an icon for resizing a window in a title bar of each window, wherein the resizing is performed in accordance with the at least one processor coupled to the memory executing the process steps associated with the resizing module; and d. a configuration module residing in the memory, wherein the configuration module manages simultaneous arrangement of multiple windows to be resized and repositioned in response to a global window action button being triggered in a configuration panel, and manages sequential arrangement of the one or more windows to be resized and repositioned one at a time in response to a local window action button being triggered in the configuration panel;

wherein the one or more windows are a plurality of windows, wherein the resizing module resizes and repositions each of the plurality of windows sequentially one at a time in response to a first button being configured in a desk command menu, with each one of the plurality of windows being simultaneously displayed on a graphical user interface after being resized and repositioned, and wherein the resizing module resizes and repositions the one or more windows simultaneously in response to a second button being configured in a desk command menu.

* * * * *